(12) United States Patent
MacKenzie

(10) Patent No.: US 12,495,744 B2
(45) Date of Patent: Dec. 16, 2025

(54) INTERLOCKING MODULAR PLANTING SYSTEM FOR ROOF APPLICATIONS

(71) Applicant: Hortech, Inc., Nunica, MI (US)

(72) Inventor: David S. MacKenzie, Nunica, MI (US)

(73) Assignee: Hortech, Inc., Nunica, MI (US)

( * ) Notice: Subject to any disclaimer, the term of this patent is extended or adjusted under 35 U.S.C. 154(b) by 36 days.

(21) Appl. No.: 18/323,783

(22) Filed: May 25, 2023

(65) Prior Publication Data

US 2024/0389522 A1 Nov. 28, 2024

(51) Int. Cl.
*A01G 9/033* (2018.01)

(52) U.S. Cl.
CPC ................... *A01G 9/033* (2018.02)

(58) Field of Classification Search
CPC ................ A01G 9/033; A01G 9/025
See application file for complete search history.

(56) References Cited

U.S. PATENT DOCUMENTS

| | | | | |
|---|---|---|---|---|
| 84,002 A * | 11/1868 | Ryder | ................... | A01G 9/0295 47/86 |
| 1,665,124 A * | 4/1928 | Wright | ..................... | A01G 9/02 47/73 |
| 2,233,397 A * | 3/1941 | Bloom | ................. | A01K 27/002 119/857 |
| 3,386,608 A * | 6/1968 | Diller | ................... | A01G 9/0295 47/87 |
| 4,058,930 A * | 11/1977 | Miles | ....................... | A01G 9/02 47/65.9 |
| 4,155,198 A * | 5/1979 | Kelley | ................. | A01G 9/0295 47/84 |
| 5,281,185 A * | 1/1994 | Lee | ........................ | A63H 33/10 446/85 |
| 5,467,555 A * | 11/1995 | Ripley, Sr. | ............ | E01C 13/083 47/1.01 R |
| 5,595,021 A * | 1/1997 | Ripley, Sr. | ............ | E01C 13/083 47/65.9 |
| 5,675,933 A * | 10/1997 | Kawaguchi | ............ | A01G 9/029 47/65.9 |
| 5,953,859 A * | 9/1999 | Cochran | ................ | A01G 9/028 47/41.1 |
| 6,178,690 B1 * | 1/2001 | Yoshida | ................ | A01G 9/033 47/65.9 |

(Continued)

FOREIGN PATENT DOCUMENTS

CA 2771937 A1 * 10/2012 ............. A01G 1/007

*Primary Examiner* — Monica L Perry
(74) *Attorney, Agent, or Firm* — Price Heneveld LLP

(57) ABSTRACT

A modular green roof system includes a planter including a bottom wall, a plurality of sidewalls, an interior space and a plurality of corners located between adjacent sidewalls, the sidewalls including an upper edge that extends to a first height above the bottom wall, the first height being constant between adjacent corners, and an insert removably inserted into the interior space to retain a plant matter in the interior space and extending above the sidewalls to retain the plant matter in the interior space where the plant matter extends above the upper edge of the sidewalls, the insert extending to a second height above the upper edge of the sidewalls of the planter, and wherein a ratio of the second height to the first height is equal to or greater than about 0.4.

17 Claims, 3 Drawing Sheets

(56) References Cited

U.S. PATENT DOCUMENTS

| | | | | |
|---|---|---|---|---|
| 6,237,285 B1* | 5/2001 | Yoshida | A01G 9/033 | 47/65.9 |
| 6,253,487 B1* | 7/2001 | Yoshida | A01G 9/033 | 47/33 |
| 6,536,361 B1* | 3/2003 | Wu | A01G 9/033 | 111/901 |
| 6,606,823 B1* | 8/2003 | McDonough | A01G 9/033 | 52/173.3 |
| 6,711,851 B2* | 3/2004 | Mischo | A01G 9/033 | 47/65.9 |
| 6,862,842 B2* | 3/2005 | Mischo | A01G 9/033 | 47/65.9 |
| 8,235,863 B2* | 8/2012 | Mathy | A01G 27/02 | 477/79 |
| 8,555,546 B2* | 10/2013 | MacKenzie | A01G 9/033 | 47/65.9 |
| 9,095,097 B2* | 8/2015 | MacKenzie | A01G 20/00 | |
| 2004/0040209 A1* | 3/2004 | Layt | A01G 9/028 | 47/86 |
| 2006/0123704 A1* | 6/2006 | Yoshida | A01G 9/02 | 47/79 |
| 2007/0261299 A1* | 11/2007 | Kephart | A01G 9/033 | 52/173.1 |
| 2008/0168710 A1* | 7/2008 | MacKenzie | A01G 9/022 | 47/65.9 |
| 2014/0000161 A1* | 1/2014 | MacKenzie | A01G 9/033 | 47/65.9 |
| 2018/0220594 A1* | 8/2018 | MacKenzie | A01G 9/033 | |
| 2022/0240459 A1* | 8/2022 | MacKenzie | A01G 9/033 | |
| 2023/0026595 A1* | 1/2023 | Gartland | H02S 20/24 | |

* cited by examiner

INTERLOCKING MODULAR PLANTING SYSTEM FOR ROOF APPLICATIONS

BACKGROUND OF THE INVENTION

The present invention relates to a modular planting system for roof applications, and in particular to a modular planting system that includes a plurality of planter modules each including a planter for receiving plant matter therein and an insert, wherein the planter and insert are configured to promote sufficient fluid communication between adjacent planter modules to support and maintain optimum plant growth

SUMMARY OF THE INVENTION

One embodiment as disclosed and described herein includes a modular green roof system that includes a planter including a bottom wall and a plurality of sidewalls that cooperate with the bottom wall to form an interior space of the planter and a plurality of corners located between adjacent sidewalls of the plurality of sidewalls, each of the sidewalls of the plurality of sidewalls including an upper edge, wherein at least one sidewall of the plurality of sidewalls extends to a first height above the bottom wall, and wherein the first height is substantial constant between adjacent corners of the plurality of corners, and an insert removably inserted into the interior space of the planter where the collar includes a plurality of walls that cooperate to form an interior space of the insert, wherein the insert is configured to retain the plant matter in the interior space of the of the insert, the plurality of walls of the insert extending above the plurality of sidewalls of the planter, the plurality of walls of the insert configured to retain a plant matter in the interior space of the insert where the plant matter extends above the upper edge of the plurality of sidewalls of the planter, at least one of the walls of the plurality of walls of the insert extending to a second height above the upper edge of the at least one sidewall of the planter, and wherein a ratio of the second height to the first height is equal to or greater than about 0.4.

Another embodiment as disclosed and described herein may additionally or alternatively include a modular green roof system that includes a planter including a bottom wall and a plurality of sidewalls that cooperate with the bottom wall to form an interior space of the planter and a plurality of corners located between adjacent sidewalls of the plurality of sidewalls, each of the sidewalls of the plurality of sidewalls including an upper edge, wherein at least one sidewall of the plurality of sidewalls extends to a first height above the bottom wall, and an insert removably inserted into the interior space of the planter where the insert includes a plurality of walls that cooperate to form an interior space of the insert, wherein the insert is configured to retain a plant matter in the interior space of the of the insert, the plurality of walls of the insert extending above the plurality of sidewalls of the planter, the plurality of walls of the insert configured to retain a plant matter in the interior space of the insert where the plant matter extends above the upper edge of the plurality of sidewalls of the planter, at least one of the walls of the plurality of walls extending to a second height above the upper edge of the at least one sidewall of the planter, and wherein a ratio of the second height to the first height is equal to or greater than about 0.66.

Yet another embodiment as disclosed and described herein may additionally or alternatively include a method for installing a modular green roof system that includes providing a planter including a bottom wall and a plurality of sidewalls that cooperate with the bottom wall to form an interior space of the planter and a plurality of corners located between adjacent sidewalls of the plurality of sidewalls, each of the sidewalls of the plurality of sidewalls including an upper edge located at a first height above the bottom wall, providing an insert that includes a plurality of walls that cooperate to form an interior space of the insert, and inserting the insert into the interior space of the planter such that the plurality of walls of the insert extend to a second height above the upper edge of the sidewalls of the planter, wherein a ratio of the second height to the first height is equal to or greater than about 0.66. The method may further include placing a growing a plant matter within the interior space of the insert such that at least a portion of the plant matter is located above the upper edge of the sidewalls of the planter, positioning the planter proximate to at least one other planter that is substantially similar to the positioned planter, and removing the insert from the interior space of the planter such that the portion of the plant matter extending upwardly from the upper edge of the sidewalls of the planter abuts a portion of the plant matter extending upwardly from an upper edge of the at least one other planter.

These and other advantages of the invention will be further understood and appreciated by those skilled in the art by reference to the following written specification, claims and appended drawings.

DETAILED DESCRIPTION OF THE PREFERRED EMBODIMENTS

Figure 2:
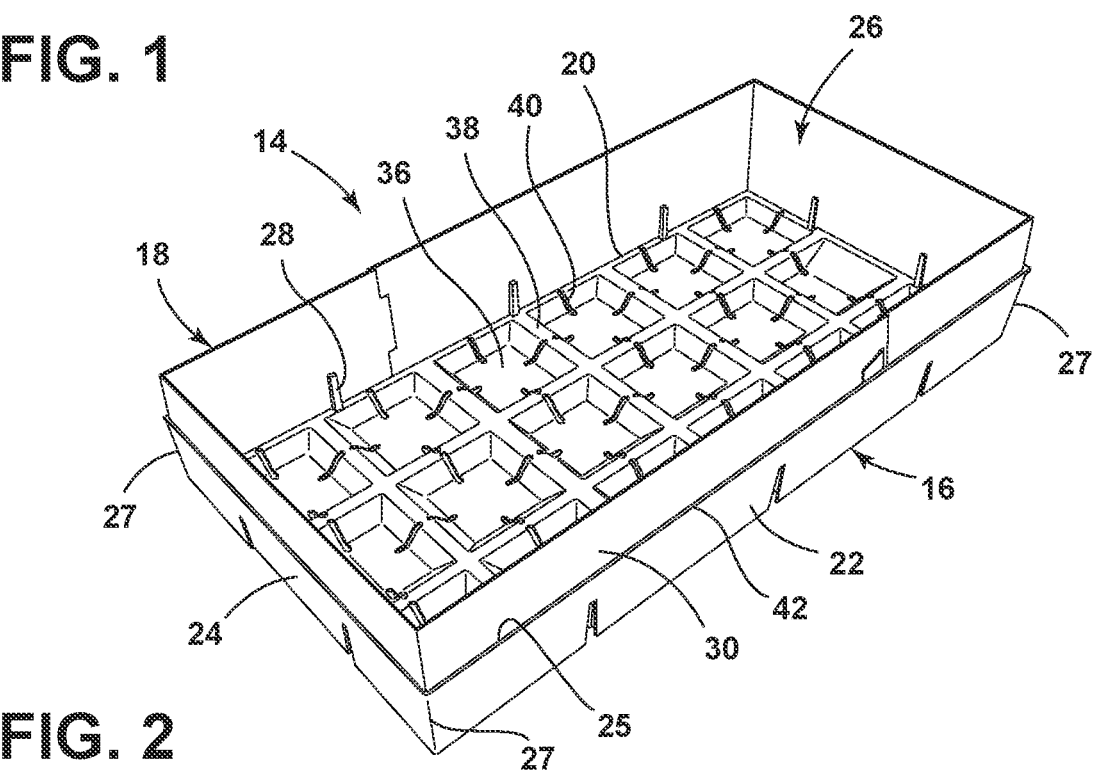
FIG. 2 is a perspective view of a green roof planter module that includes a collar member removably inserted into an associated planter, and a coupling member.
Figure 6:
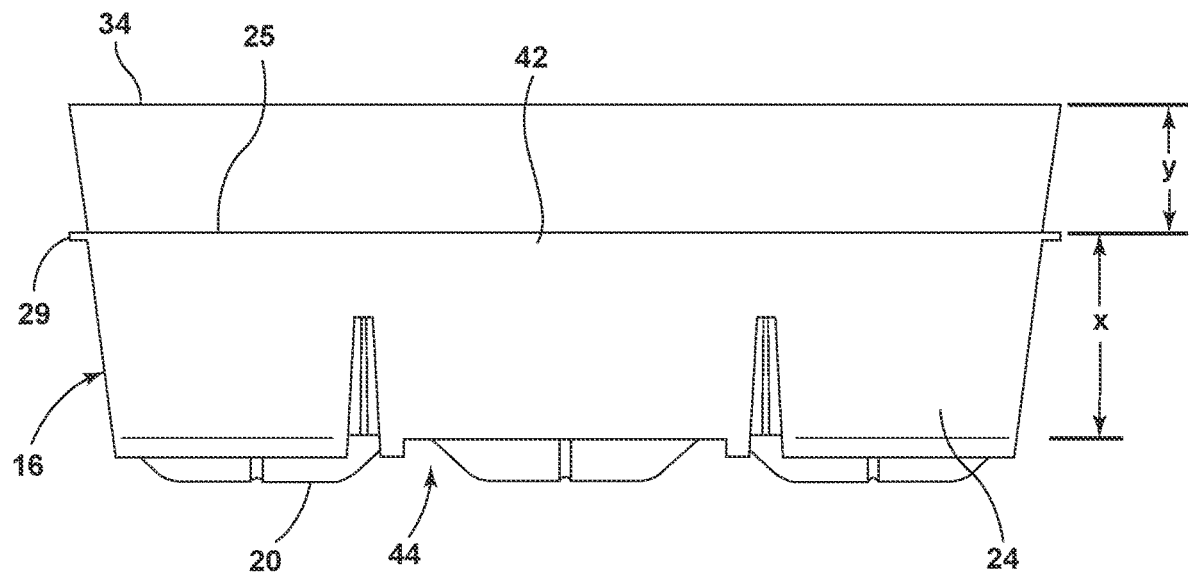
FIG. 6 is an end view of the planter.

For purposes of description herein, the terms "upper," "lower," "right," "left," "rear," "front," "vertical," "horizontal," and derivatives thereof shall relate to the invention as oriented in FIGS. 2 and 6. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
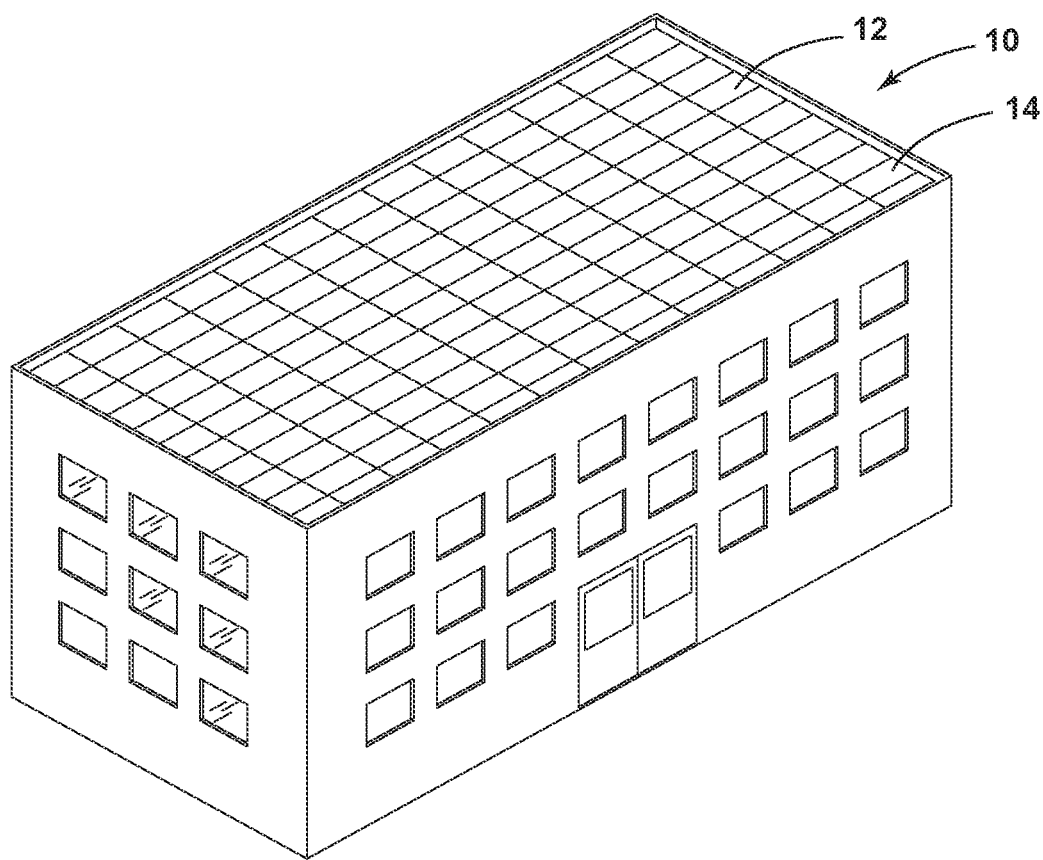
FIG. 1 is a perspective view of a building employing a green roof system embodying the present invention.
Figure 3:
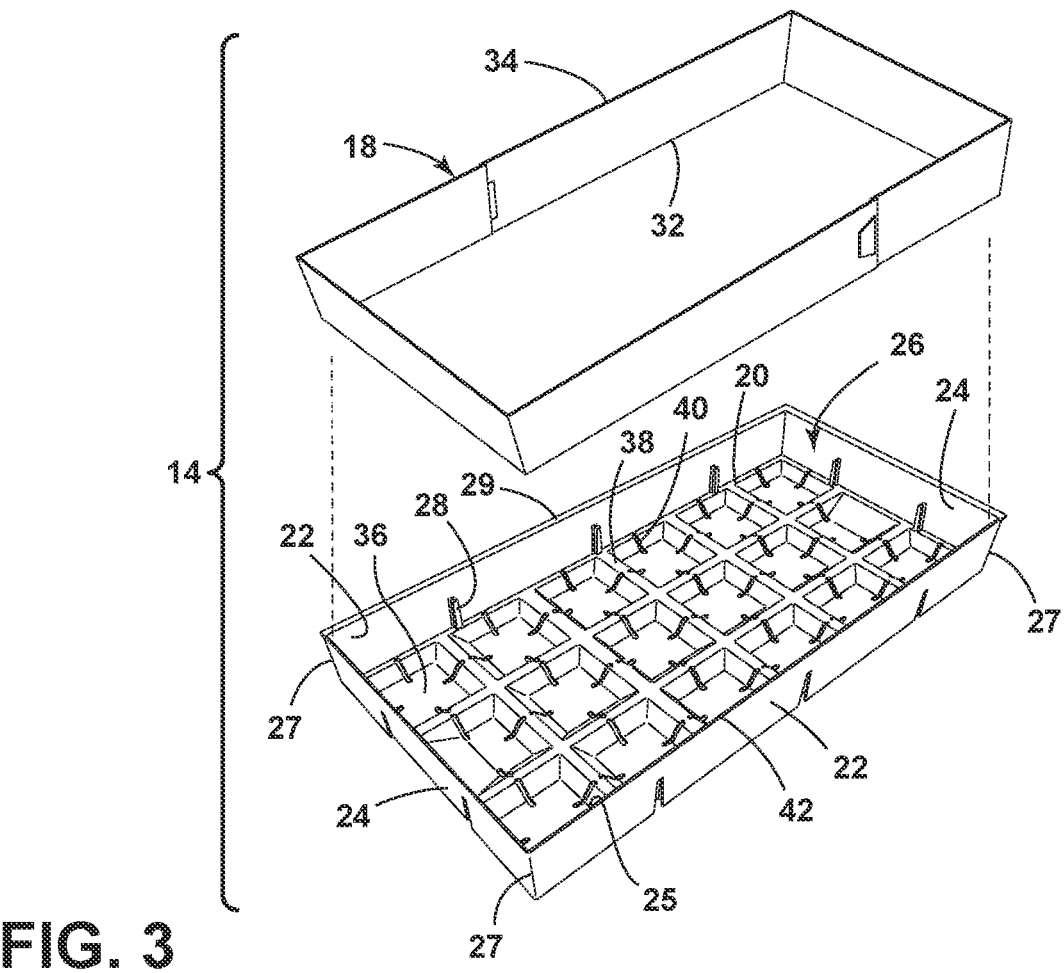
FIG. 3 is an exploded perspective view of the planter module.

The reference numeral 10 (FIG. 1) generally designates a green roof system embodying the present invention and employed on a building roof 12 and comprising a plurality of individual green roof planter modules 14. In the illustrated example, each of the planter modules 14 (FIGS. 2 and 3) comprises a planter 16 and a removable collar or insert 18 inserted into the planter 16 such that the collar 18 extends upwardly from an uppermost edge of the planter 16, thereby allowing the retention of plant matter that extends above an upper edge of the planter 16.

Figure 4:
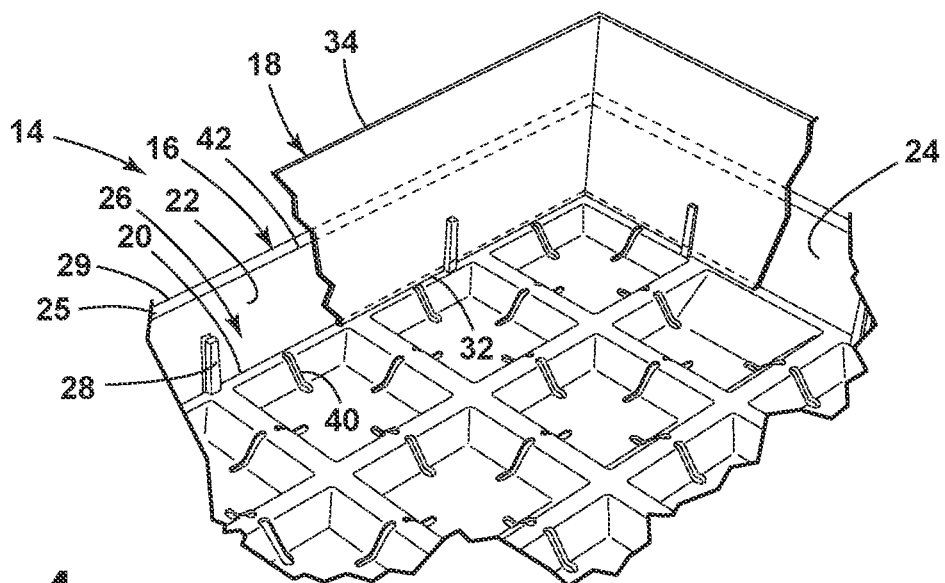
FIG. 4 is an enlarged perspective view of the planter module including a cut-away portion of the collar member inserted into the planter.

Each planter 16 includes a bottom wall 20, a plurality of walls that include sidewalls 22 and end walls 24 that cooperate with the bottom wall 20 to form an interior space 26, corners 27 between the sidewalls 22 and end walls 24, and a plurality of support tabs 28 (FIGS. 4 and 5) spaced about the interior space 26 and that extend inwardly toward the interior space 26. Each of the sidewalls 22 and end walls 24 include a top or uppermost edge 25. Preferably, the height of the sidewalls 22 and end walls 24 remains the same between adjacent corners 27, and more preferably about the entire periphery of the planter 16, with the top edge 25 of the sidewalls 22 and the end walls being straight, without upwardly or downwardly extending irregularities, tabs, reliefs, apertures, and the like. As best illustrated in FIG. 4, each of the support tabs 28 extends upwardly from the bottom wall 20 and is spaced from an associated sidewall 22 or end wall 24. The planter 16 is preferably integrally molded by injection molding, press forming, and the like, and is constructed of a material such as plastic. It is noted that the straight top edge 25 and consistent height of the sidewalls 22 and end walls 24 reduces associated manufacturing costs of the planter 16 as compared to planters having reliefs of apertures extending into a top edge or tabs extending from a top edge of an associated wall, or aperture and/or holes extending through the wall. In the illustrated example, the planter 16 is providing a rectangularly-shaped overall plan form, however, other configurations may also be utilized. Further, it is noted that the tabs 28 are configured to abut the bottom surface of the bottom wall 20 of another planter 16 when multiple planters are placed in a stacked relationship. As illustrated, one of the sidewalls 22 and one of the end walls 24 may include an outwardly-extending overlap tab 29 that overlaps a respective sidewall or end wall of an adjacent planter 16.

The collar member 18 includes a plurality of walls 30 each having a bottom edge 32 and a top edge 34. In the illustrated example, the collar member 18 comprises two pieces that extend in a rectangular manner about the planter 16. Alternatively, the collar member 18 could comprise a single, integral piece, or more than two pieces. Specifically, the collar member 18 extends about the interior space 26 of the associated planter 16 such that the bottom edge 32 of each of the walls 30 is inserted between the sidewalls and end walls 22, 24 of the planter 16 and the associated support tabs 28, thereby retaining the collar member 18 within the interior space 26 of the planter 16, and such that the walls 30 of the collar member 18 extend upwardly from the top edge 25 of the sidewalls and end walls 22, 24 of the planter 16. Although locking tabs are illustrated between each of the pieces of the collar, overlapping, non-tabbed ends may also be utilized.

In one embodiment, the collar member 18 is inserted into the interior space 26 of planter 16, in a manner described above, and a plant matter that comprises grown plants, plant seedlings, plant seeds and the like, and soil and/or aggregate is also inserted into the interior space 26 of the planter 16. Subsequently, plants are grown within the interior space 26 until such plant matter extends upwardly above the top edge 25 of the sidewalls and end walls 22, 24 of the planter 16. The planter module 14 is then placed in rows or a grid work-like pattern upon a roof 12 (FIG. 1) and the collar member 18 removed such that the plant matter within the interior space 26 of the planter 16 abuts similar plant matter in adjacent planter modules 14, thereby providing a connected roof system that will quickly provide an interconnected and aesthetically-pleasing planted surface. In another embodiment, the collar member 18 comprises a biodegradable material that may be left within the planter 16 placed within the overall grid work of the green roof system 10. In yet another embodiment, the collar member may additionally or alternatively be water permeable thereby allowing water to flow through the collar member 18 and between adjacent planter modules 14. The collar member 18 of the various embodiments may angle outwardly from the associated sidewalls and end walls 22, 24 of the planter 16, thereby promoting a tight abutment of the plant matter extending above the top edge 25 of the sidewalls and end walls 22, 24 between adjacent planter modules 14.

Figure 5:
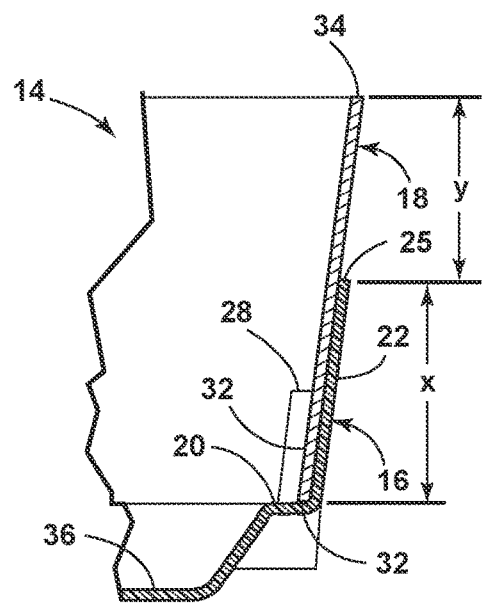
FIG. 5 is a partial cross-sectional end view of the planter module.

The proper communication of water between adjacent planters 16 may also be provided by additional or alternative elements within the planter 16. As best illustrated in FIG. 2, the bottom wall 20 of the planter 16 comprises a grid work-like pattern of recesses 36 segmented by raised portions 38. A plurality of drainage apertures 40 extend through the recesses 36 and the raised portions 38. It is noted that at least a portion of each of the drainage apertures 40 extend through a lowermost portion of the bottom wall 20, thereby eliminating standing water within the planter 16. Further, the relative height of the planter 16 and the height of the collar member 18 may be configured to provide proper and adequate water between adjacent planter modules 14 without requiring the inclusion of apertures and/or reliefs extending into or through the sidewalls 22 and/or the end walls 24. As best illustrated in FIGS. 5 and 6, a ratio of the height y to which the collar member 18 extends above the top edge 25 of the sidewall 22 and/or end wall 24 to the height x of the sidewall 22 and/or end wall 24 from the bottom wall 20 to the top edge 34 of the sidewall 22 and/or end wall 24 is preferably equal to or greater than about 0.4, more preferably greater than or equal to about 0.6, even more preferably greater than or equal to about 0.8, and most preferably greater than or equal to about 1.0. In one embodiment, the ratio is within a range of from about 0.4 to about 1.7. By way of example, the planter module 16 may be provided with a planter 16 having sidewalls 22 and end walls 24 each having a height x of 3 inches and a collar member 18 that extends to a height y of 1.25 inches above the top edge 25 of the sidewalls 22 and end walls 24; a planter 16 having sidewalls 22 and end walls 24 each having a height x of 3 inches and a collar member 18 that extends to a height y of 5 inches above the top edge 25 of the sidewalls 22 and the end walls 24; a planter 16 having sidewalls and end walls 24 each having a height x of 1.25 inches and a collar member 18 that extends to a height y of 1 inch above the top edge 25 of the sidewalls 22 and the ends wall 24; and a planter 16 having sidewalls end wall 24 each having a height x of 3 inches and a collar member 18 that extends to a height y above the top edge 25 of the sidewalls 22 and end walls 24.

The planter 16 (FIG. 6) further includes a pair of gripping reliefs 44 located at each end thereof. Specifically, each relief 44 is provided within the intersection of an associated end wall 24 and the bottom wall 20 such that a user is able to insert their fingers into the reliefs 44, thereby allowing easy gripping and support of the planter module 14.

The present inventive green roof system provides coverage of an entire roof area quickly and economically by allowing the associated modules to be grown off-sight in a manner that allows the plant matter to extend upwardly from an associated planter and plant matter within adjacent modules to abut immediately upon installation. The roof system is also easy to install at a relatively low cost. Further, the system provides improved water communication and drainage between adjacent modules, allows easy maintenance of the overall system, can be installed easily and quickly by even unskilled personnel, is capable of a long-operating life, and is particularly well adapted for the proposed use. Moreover, the present inventive interlocking arrangement between adjacent modules/assemblies prevents any single module/assembly from being vertically displaced without necessarily vertically displacing adjacent modules/assemblies.

In the foregoing description, it will be readily appreciated by those skilled in the art, that modifications may be made to the invention without departing from the concepts as disclosed herein, such modifications are to be considered as included in the following claims, unless these claims by their language expressly state otherwise.

The invention claimed is:

1. A modular green roof system, comprising:
a planter including a bottom wall and a plurality of sidewalls that cooperate with the bottom wall to form an interior space of the planter and a plurality of corners located between adjacent sidewalls of the plurality of sidewalls, each of the sidewalls of the plurality of sidewalls including an upper edge, wherein at least one sidewall of the plurality of sidewalls extends to a first height above the bottom wall, and wherein the first height is substantially constant between adjacent corners of the plurality of corners; and
an insert removably inserted into the interior space of the planter where the insert includes a plurality of walls that cooperate to form an interior space of the insert, wherein the insert is configured to retain a plant matter in the interior space of the insert, the plurality of walls of the insert extending above the plurality of sidewalls of the planter, the plurality of walls of the insert configured to retain the plant matter in the interior space of the insert above the upper edge of the plurality of sidewalls of the planter, at least one of the walls of the plurality of walls of the insert extending to a second height above the upper edge of the at least one sidewall of the planter, and wherein a ratio of the second height to the first height is within a range of from about 0.4 to about 1.7.

2. The modular green roof system of claim 1, wherein the ratio is greater than or equal to about 0.66.

3. The modular green roof system of claim 2, wherein the ratio is greater than or equal to about 1.

4. The modular green roof system of claim 1, wherein the insert comprises a plastic.

5. The modular green roof system of claim 1, wherein planter comprises a molded plastic.

6. A modular green roof system, comprising:
a planter including a bottom wall and a plurality of sidewalls that cooperate with the bottom wall to form an interior space of the planter and a plurality of corners located between adjacent sidewalls of the plurality of sidewalls, each of the sidewalls of the plurality of sidewalls including an upper edge, wherein at least one sidewall of the plurality of sidewalls extends to a first height above the bottom wall; and
an insert removably inserted into the interior space of the planter where the insert includes a plurality of walls that cooperate to form an interior space of the insert, wherein the insert is configured to retain a plant matter in the interior space of the of the insert, the plurality of walls of the insert extending above the plurality of sidewalls of the planter, the plurality of walls of the insert configured to retain the plant matter in the interior space of the insert where the plant matter extends above the upper edge of the plurality of sidewalls of the planter, at least one of the walls of the plurality of walls of the insert extending to a second height above the upper edge of the at least one sidewall of the planter, and wherein a ratio of the second height to the first height is within a range of from about 0.4 to about 1.7.

7. The modular green roof system of claim 6, wherein the ratio is greater than or equal to about 1.

8. The modular green roof system of claim 6, wherein the ratio is within a range of between about 0.66 and 1.7.

9. The modular green roof system of claim 6, wherein the insert comprises plastic.

10. The modular green roof system of claim 6, wherein planter comprises a molded plastic.

11. The modular green roof system of claim 6, wherein the plurality of walls of the insert angle outwardly from the plurality of sidewalls of the planter.

12. A method for installing a modular green roof system, comprising:
providing a first planter including a bottom wall and a plurality of sidewalls that cooperate with the bottom wall to form an interior space of the first planter and a plurality of corners located between adjacent sidewalls of the plurality of sidewalls, each of the sidewalls of the plurality of sidewalls including an upper edge located at a first height above the bottom wall;
providing an insert that includes a plurality of walls that cooperate to form an interior space of the insert;
inserting the insert into the interior space of the first planter such that the plurality of walls of the insert extend to a second height above the upper edge of the sidewalls of the first planter, wherein a ratio of the second height to the first height is within a range of from about 0.4 to about 1.7;
placing and growing a plant matter within the interior space of the insert such that at least a portion of the plant matter is located above the upper edge of the sidewalls of the first planter;
providing a second planter that is substantially similar to the first planter;
positioning the first planter proximate to the second planter; and
removing the insert from the interior space of the first planter such that the portion of the plant matter extending upwardly from the upper edge of the sidewalls of the first planter abuts a portion of plant matter extending upwardly from an upper edge of the second planter.

13. The method of claim 12, wherein the ratio is greater than or equal to about 1.

14. The method of claim 12, wherein the ratio is within a range of from about 0.66 to about 1.7.

15. The method of claim 12, wherein the insert comprises a plastic.

16. The method of claim 12, wherein the first planter comprises a molded plastic.

17. The method of claim 12, wherein the insert comprises a biodegradable material, and wherein removing the insert includes allowing the insert to biodegrade.

* * * * *